United States Patent
VanBlon et al.

(10) Patent No.: US 11,237,641 B2
(45) Date of Patent: Feb. 1, 2022

(54) PALM BASED OBJECT POSITION ADJUSTMENT

(71) Applicant: Lenovo (Singapore) Pte. Ltd., Singapore (SG)

(72) Inventors: Russell Speight VanBlon, Raleigh, NC (US); Arnold S. Weksler, Raleigh, NC (US); Nathan J. Peterson, Oxford, NC (US); John Carl Mese, Cary, NC (US); Mark Patrick Delaney, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/833,161

(22) Filed: Mar. 27, 2020

(65) Prior Publication Data
US 2021/0303074 A1     Sep. 30, 2021

(51) Int. Cl.
| | | |
|---|---|---|
| *G06F 3/01* | (2006.01) | |
| *G06F 3/03* | (2006.01) | |
| *G06T 19/00* | (2011.01) | |
| *G02B 27/01* | (2006.01) | |
| *G02B 27/00* | (2006.01) | |
| *G06F 3/16* | (2006.01) | |

(52) U.S. Cl.
CPC ......... *G06F 3/017* (2013.01); *G02B 27/0093* (2013.01); *G02B 27/0172* (2013.01); *G06F 3/013* (2013.01); *G06F 3/0304* (2013.01); *G06F 3/167* (2013.01); *G06T 19/006* (2013.01)

(58) Field of Classification Search
CPC ...... G06F 3/011; G06F 3/017; G06F 3/04815; G06F 3/012; G06F 3/0304; G06F 3/167; G06F 3/013; G06F 3/04842; G06F 1/163; G06F 3/0482; G06F 3/016; G06F 3/01
See application file for complete search history.

(56) References Cited

U.S. PATENT DOCUMENTS

| | | | |
|---|---|---|---|
| 9,043,732 B2* | 5/2015 | Nurmi | G06F 1/1613 715/863 |
| 10,607,413 B1* | 3/2020 | Marcolina | G06F 3/017 |
| 2009/0217211 A1* | 8/2009 | Hildreth | G06F 3/017 715/863 |
| 2010/0050134 A1* | 2/2010 | Clarkson | G06F 3/017 715/863 |
| 2011/0173204 A1* | 7/2011 | Murillo | A63F 13/428 707/741 |
| 2012/0102436 A1* | 4/2012 | Nurmi | G06F 3/041 715/863 |
| 2012/0121185 A1* | 5/2012 | Zavesky | G06K 9/00389 382/195 |

(Continued)

*Primary Examiner* — Olga V Merkoulova
(74) *Attorney, Agent, or Firm* — Ference & Associates LLC

(57) ABSTRACT

One embodiment provides a method, including: receiving, at an information handling device, selection input on a virtual object from a user; identifying, using at least one sensor, a direction that a palm of the user is oriented towards; determining, using a processor, whether movement of the palm is detected toward the direction; and adjusting, responsive to determining that the movement of the palm is detected toward the direction, a position of the virtual object toward the direction. Other aspects are described and claimed.

20 Claims, 3 Drawing Sheets

(56) References Cited

U.S. PATENT DOCUMENTS

| | | | | |
|---|---|---|---|---|
| 2012/0179970 | A1* | 7/2012 | Hayes | G06F 3/04842 715/722 |
| 2012/0194517 | A1* | 8/2012 | Izadi | G06T 7/20 345/420 |
| 2012/0268410 | A1* | 10/2012 | King | G06T 17/10 345/173 |
| 2013/0182902 | A1* | 7/2013 | Holz | G06T 7/75 382/103 |
| 2013/0293683 | A1* | 11/2013 | Zhou | H04N 5/23238 348/47 |
| 2015/0103004 | A1* | 4/2015 | Cohen | G06F 3/04815 345/158 |
| 2015/0135132 | A1* | 5/2015 | Josephson | H04L 67/12 715/784 |
| 2015/0169076 | A1* | 6/2015 | Cohen | G06F 3/0304 345/156 |
| 2015/0220776 | A1* | 8/2015 | Cronholm | G06F 3/017 382/103 |
| 2015/0355827 | A1* | 12/2015 | Van Der Westhuizen | G06F 3/04842 715/788 |
| 2016/0124513 | A1* | 5/2016 | Dal Zot | G06K 9/00355 715/863 |
| 2017/0180622 | A1* | 6/2017 | Zabatani | F16K 31/363 |
| 2018/0364884 | A1* | 12/2018 | Qian | G06F 3/011 |
| 2019/0094981 | A1* | 3/2019 | Bradski | G06F 3/011 |
| 2019/0362562 | A1* | 11/2019 | Benson | G06K 9/00671 |
| 2020/0005026 | A1* | 1/2020 | Andersen | A63F 13/213 |
| 2020/0050342 | A1* | 2/2020 | Lee | G06T 13/20 |
| 2020/0310561 | A1* | 10/2020 | Connellan | G06F 3/0346 |
| 2020/0341539 | A1* | 10/2020 | Ke | G06T 7/246 |

\* cited by examiner

PALM BASED OBJECT POSITION ADJUSTMENT

BACKGROUND

Users of information handling devices ("devices"), for example, laptops, smart TVs, head-mounted displays ("HMDs"), and the like, can visualize and interact with virtual content in a variety of different ways. For example, users can select a virtual object (e.g., presented on a display of the device, etc.) and thereafter adjust its position to another position in virtual space.

BRIEF SUMMARY

In summary, one aspect provides a method, comprising: receiving, at an information handling device, selection input on a virtual object from a user; identifying, using at least one sensor, a direction that a palm of the user is oriented towards; determining, using a processor, whether movement of the palm is detected toward the direction; and adjusting, responsive to determining that the movement of the palm is detected toward the direction, a position of the virtual object toward the direction.

Another aspect provides an information handling device, comprising: at least one sensor; a processor; receive selection input on a virtual object from a user; identify a direction that a palm of the user is oriented towards; detect, subsequent to the identifying, movement of the palm in the direction; and adjust a position of the virtual object toward the direction.

A further aspect provides a product, comprising: a storage device that stores code, the code being executable by a processor and comprising: code that receives selection input on a virtual object from a user; code that identifies a direction that a palm of the user is oriented towards; code that detects, subsequent to the identifying, movement of the palm in the direction; and code that adjusts a position of the virtual object toward the direction.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
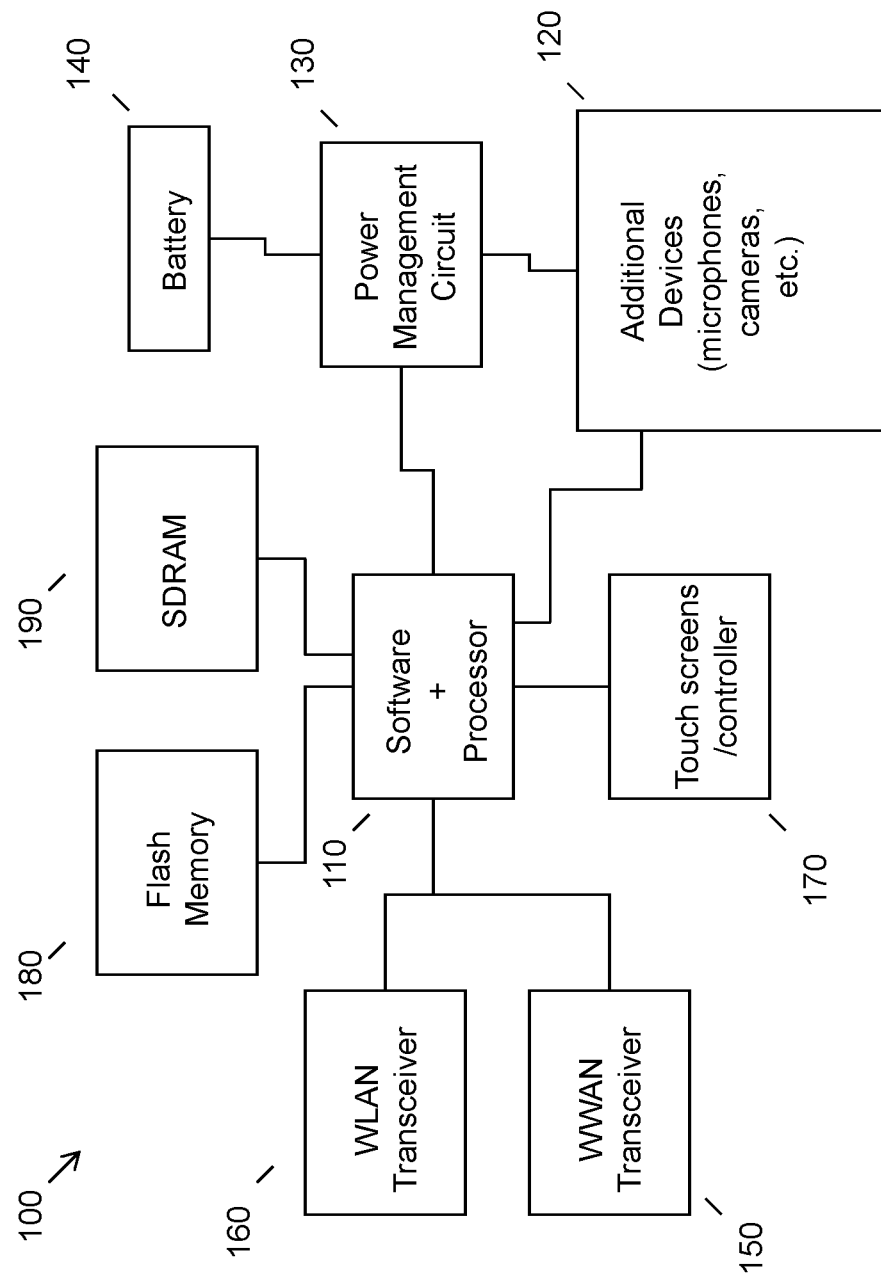
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Users frequently adjust the positions of virtual objects (e.g., icons, application windows, setting sliders, other types of virtual objects, etc.) on a display (e.g., of a smart phone or tablet, of a HMD, etc.) for a variety of different reasons (e.g., to move the virtual object to a more accessible location, to unblock another object, to enable a setting adjustment, etc.). The adjustment is conventionally facilitated by the detection of at least three user inputs. More particularly, using the popular "grab gesture" as an example, to adjust the position of a virtual slider a user must first grab the slider, hold and/or move the slider to a desired position, and thereafter release slider. This three step process does not always allow for efficient adjustment control.

Accordingly, an embodiment provides a method for adjusting a position of a virtual object. In an embodiment, selection input (e.g., gaze input, touch input, proximity input, and voice input, etc.) may be received on a virtual object displayed by a device. An embodiment may identify a direction that a palm of the user is oriented towards (e.g., up, down, left, right, etc.) and detect whether the palm subsequently moves toward that direction. Responsive to detecting palm movement in the direction that the palm is oriented towards, an embodiment may adjust a position of the virtual object (e.g., an embodiment may move the virtual object towards the identified direction). Such an embodiment may make adjustment of a virtual object easier and more seamless.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
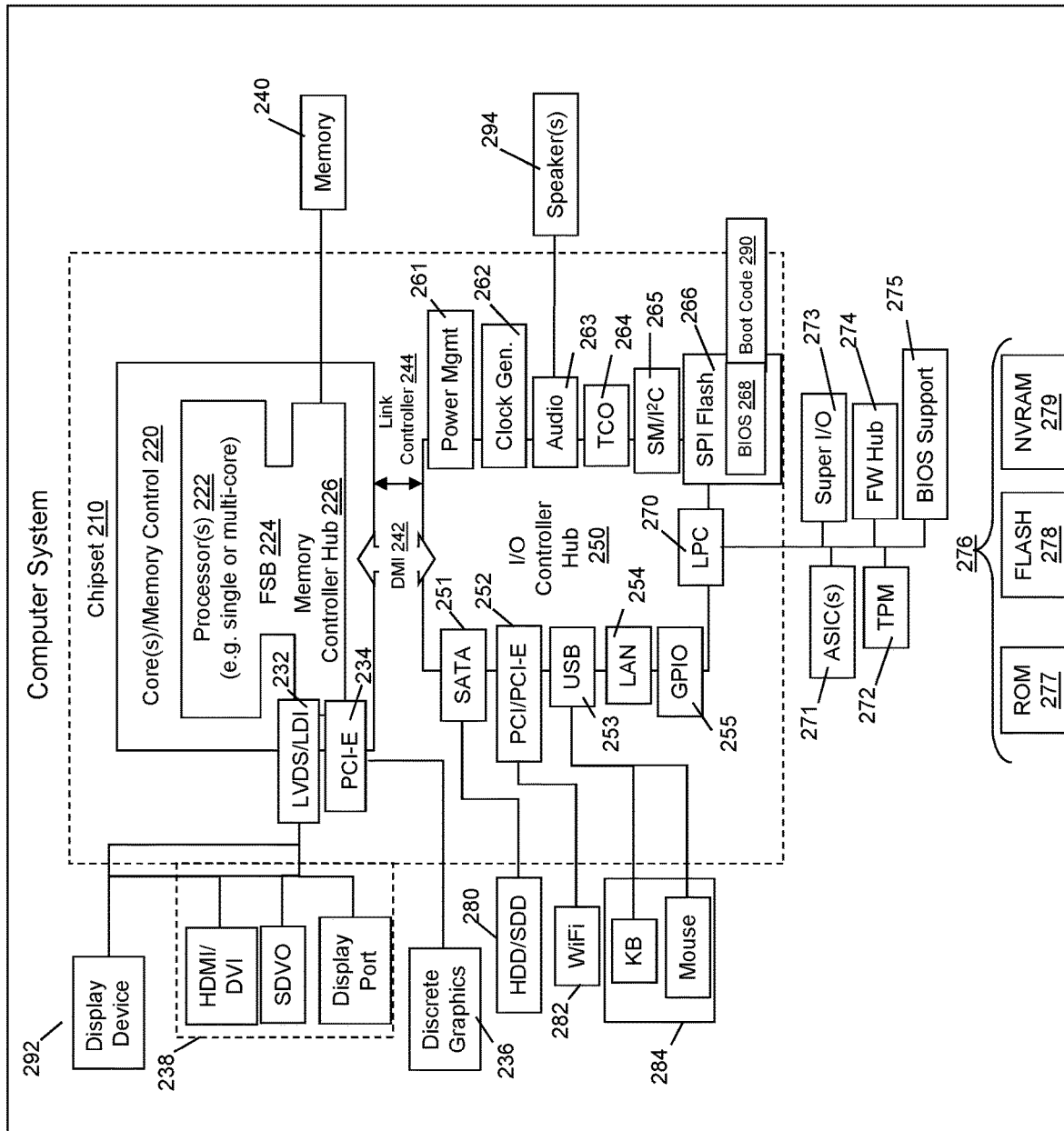
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices that comprise at least one display and allow users to move virtual objects around on that display. For example, the circuitry outlined in FIG. 1 may be implemented in a smart phone or tablet embodiment, whereas the circuitry outlined in FIG. 2 may be implemented in an HMD.

Figure 3:
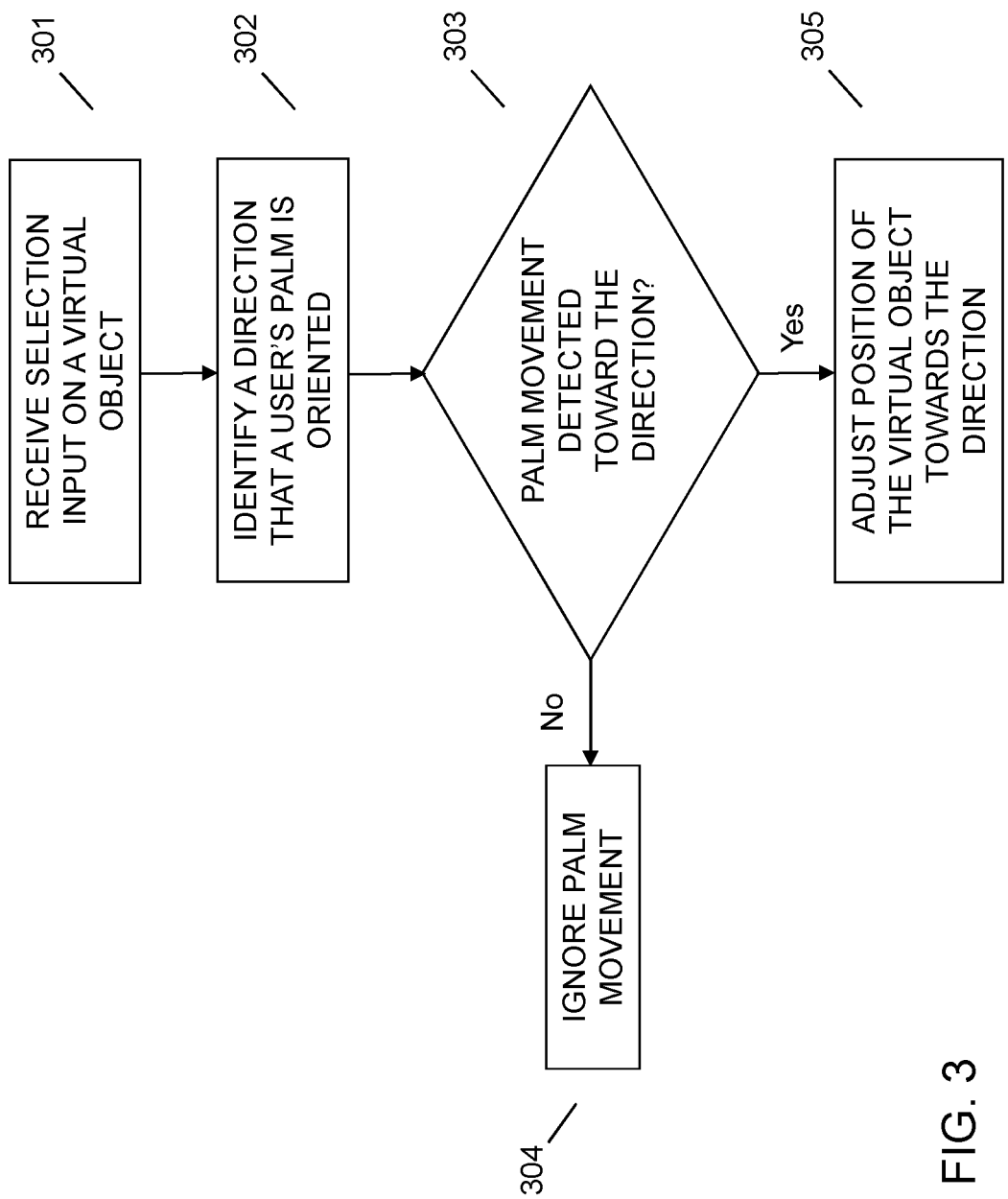
FIG. 3 illustrates an example method of adjusting a position of a virtual object.

Referring now to FIG. 3, an embodiment provides a method for adjusting a position of a virtual object. At 301, an embodiment may receive selection input on a virtual object from a user. The virtual object may be presented on a display of a device and may be virtually any type of virtual object that is capable of being moved from one position to another (e.g., an icon, an application window, a setting slider, another type of virtual object, etc.). In an embodiment, the selection input may be virtually any input type conventionally utilized for object selection, for example, gaze input (e.g., by determining that a user's gaze has fallen on an object for a predetermined period of time, etc.), touch input (e.g., by determining that a user's finger or stylus has made contact with the displayed position of the virtual object, etc.), proximity input (e.g., by determining that a user's stylus or body part is positioned substantially next to a virtual object for a predetermined period of time, etc.), voice input (e.g., by determining that one or more spoken phrases by the user correspond to the virtual object, etc.), and the like. The selection input may be detected by one or more relevant input-detecting sensors (e.g., touch sensors, cameras, microphones, etc.).

For simplicity purposes, the subsequent discussion will described using an HMD as the device and using a proximity selection facilitated by the user's hand as the selection input. Additionally, the virtual objects displayed on the HMD may be at least one of: an augmented reality ("AR") object or a virtual reality ("VR") object. It is important to note that such designations are not limiting and that other devices and selection input types, not further or explicitly described here, may also be utilized.

At 302, an embodiment may identify a direction that a palm of the user is oriented towards. The palm direction may refer to virtually any 360-degree direction that a user's palm may be oriented. For example, the palm may be oriented in: a substantially vertical direction (e.g., the palm may face upwards, the palm may face downwards, etc.), a substantially horizontal direction (e.g., the palm may face left, the palm may face right, etc.), a back and forth direction (e.g., the palm may face toward the user, the palm may face away from the user, etc.) a substantially diagonal direction, or any combination of the foregoing. The identification of the direction of the palm face may be facilitated by using at least one sensor integrally or operatively coupled to the device (e.g., a camera sensor, etc.).

At 303, an embodiment may determine whether any detected movement of the user's hand/palm was directed toward the identified direction of the user's palm face. For example, a camera sensor may track the position of the user's hand/palm and may detect whether any movement occurs. Once movement is detected, an embodiment may identify a direction that the hand/palm is moving and compare it to the detection that the user's palm is oriented towards.

Responsive to determining, at 303, that detected movement of the user's palm was not directed toward the identified direction, an embodiment may, at 304, ignore the motion input. For example, if the user's palm face is oriented in a leftwards direction and the user's hand/palm is thereafter moved rightwards, an embodiment may ignore the rightwards motion and/or take no action on the virtual object. Conversely, responsive to determining, at 303, that detected movement of the user's palm was directed toward the identified direction, an embodiment may, at 305, adjust the position of the selected virtual object towards the identified direction.

In an embodiment, the position of the virtual object may be adjusted in a variety of ways. For example, an embodiment may move the virtual object toward the identified direction at a predetermined rate as long as palm movement input is detected towards that direction. Alternatively, in another example, an embodiment may move the virtual object to a position, in the identified direction, where the user's hand/palm is detected to stop. Stated differently, the virtual object may substantially track a position of the user's hand/palm as long as the hand/palm is moving in the identified direction.

In an embodiment, the adjustment direction of the virtual object may quickly change to correspond with an identified change to a direction that the user's palm is facing and to a movement direction of that palm. For example, a virtual object may originally move upwards responsive to identifying that a user's palm is oriented upwards and that the movement of the user's hands is also directed upwards. If, during the upwards movement, a user shifts the direction of their palm to face left and correspondingly moves their hand to the left after the direction shift, the virtual object may cease moving upwards and may thereafter move left.

In an embodiment, an adjustment control option may be activated (e.g., by the user, etc.) that may lock virtual object control into only right angle movements. More particularly, when this control is activated a user can only move the virtual object along a true orientation (e.g., true left/right or true up/down, etc.) and all angled motion may be substantially ignored. As an example, a user's palm face may be oriented upwards. If the lock option is activated, regardless of whether the user moves their hand straight upwards or diagonally upwards the selected virtual object will only move straight up and all diagonal motion may be ignored.

In an embodiment, the adjustment of the position of the virtual object may have a secondary effect on the device or on an application of the device. For example, if the virtual object is a slider of some sort (e.g., a volume adjustment slider, a brightness adjustment slider, etc.) then adjustment of the slider may correspondingly affect some setting on the device (e.g., adjusting a volume slider upwards may increase the volume of media played on the device, adjusting a brightness slider downwards may decrease the brightness of the display, etc.).

The various embodiments described herein thus represent a technical improvement to conventional methods for adjusting a position of a virtual object. Using the techniques described herein, an embodiment may receive a selection input on a virtual object (e.g., an AR object, a VR object, another type of virtual object, etc.). An embodiment may then identify a direction that a palm of the user is oriented towards and thereafter determine if any detected palm movement is directed toward that identified direction. Responsive to determining that the palm movement is directed toward the direction that the palm is facing, an embodiment may move the virtual object toward the palm face direction. Such a method may simplify the process required to move virtual objects in digital space.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
receiving, at an information handling device, selection input on a virtual object from a user, wherein the selection input corresponds to gaze input on the virtual object for a predetermined amount of time;
identifying, using at least one camera sensor, a direction that a palm of a hand of the user is oriented towards;
determining, using a processor, whether movement of the hand of the user is detected toward the direction the palm is oriented;
maintaining, responsive to determining that the movement of the hand is not consistent with the direction the palm is oriented, a position of the virtual object;
adjusting, at a predetermined rate and responsive to determining that the movement of the hand is consistent with the direction the palm is oriented, the position of the virtual object toward the direction the palm is oriented.

2. The method of claim 1, wherein the selection modality is of a type selected from the group consisting of: gaze input, touch input, proximity input, and voice input.

3. The method of claim 1, wherein the information handling device is a head-mounted display and wherein there the virtual object is at least one of: an augmented reality object and a virtual reality object.

4. The method of claim 1, wherein the direction is a direction type selected from the group consisting of a vertical direction, a horizontal direction, a back and forth direction, and a diagonal direction.

5. The method of claim 1, wherein the adjusting the position comprises adjusting the position of the virtual object to substantially match a position of the palm.

6. The method of claim 1, wherein the adjusting the position comprises moving the virtual object in the direction at a predetermined rate.

7. The method of claim 1, wherein the virtual object is a setting adjuster and wherein the adjusting the position of the virtual object comprises adjusting a device setting associated with the setting adjuster.

8. The method of claim 1, further comprising:
receiving, during the adjusting, an indication that the direction of the palm has changed to a new direction and that the movement is detected toward the new direction; and
changing, based on the indication, a trajectory of the virtual object.

9. The method of claim 1, further comprising:
identifying activation of a true-orientation setting; and
ignoring, based upon activation of the true-orientation setting, angled movements of the palm during the adjusting.

10. The method of claim 1, further comprising maintaining, responsive to determining that the movement of the palm is not detected toward the direction, the position.

11. An information handling device, comprising:
at least one camera sensor;
a processor;
receive selection input on a virtual object from a user, wherein the selection input corresponds to gaze input on the virtual object for a predetermined amount of time;
identify a direction that a palm of a hand of the user is oriented towards;
determine whether movement of the hand of the user is detected toward the direction the palm is oriented;
maintaining, responsive to determining that the movement of the hand is not consistent with the direction the palm is oriented, a position of the virtual object; and
adjust, at a predetermined rate and responsive to determining that the movement of the hand is consistent with the direction the palm is oriented, the position of the virtual object toward the direction the palm is oriented.

12. The information handling device of claim 11, wherein the selection modality is of a type selected from the group consisting of: gaze input, touch input, proximity input, and voice input.

13. The information handling device of claim 11, wherein the information handling device is a head-mounted display and wherein there the virtual object is at least one of: an augmented reality object and a virtual reality object.

14. The information handling device of claim 11, wherein the direction is a direction type selected from the group consisting of a vertical direction, a horizontal direction, a back and forth direction, and a diagonal direction.

15. The information handling device of claim 11, wherein the instructions executable by the processor to adjust comprise instructions executable by the processor to adjust the position of the virtual object to substantially match a position of the palm.

16. The information handling device of claim 11, wherein the instructions executable by the processor to adjust the position comprise instructions executable by the processor to move the virtual object in the direction at a predetermined rate.

17. The information handling device of claim 11, wherein the virtual object is a setting adjuster and wherein the adjusting the position of the virtual object comprises adjusting a device setting associated with the setting adjuster.

18. The information handling device of claim 11, wherein the instructions are further executable by the processor to:
identify activation of a true-orientation setting; and ignore, based upon activation of the true-orientation setting, angled movements of the palm during the adjusting.

19. The information handling device of claim 11, wherein the instructions are further executable by the processor to maintain, responsive to determining that the movement of the palm is not detected toward the direction, the position.

20. A product, comprising:
a storage device that stores code, the code being executable by a processor and comprising:
code that receives selection input on a virtual object from a user, wherein the selection input corresponds to gaze input on the virtual object for a predetermined amount of time;
code that identifies a direction that a palm of a hand of the user is oriented towards;
code that determines whether movement of the hand of the user is detected toward the direction the palm is oriented;
code that maintains, responsive to determining that the movement of the head is not consistent with the direction the palm is oriented, a position of the virtual object; and
code that adjusts, at a predetermined rate and responsive to determining that the movement of the hand is consistent with the direction the palm is oriented, the position of the virtual object toward the direction the palm is oriented.

* * * * *